(12) United States Patent
Kunnumpurathu Sivan

(10) Patent No.: US 11,210,223 B2
(45) Date of Patent: Dec. 28, 2021

(54) STORAGE DEVICE AND OPERATING METHOD THEREOF

(71) Applicant: SK hynix Inc., Gyeonggi-do (KR)

(72) Inventor: Sarath Kumar Kunnumpurathu Sivan, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 86 days.

(21) Appl. No.: 16/725,632

(22) Filed: Dec. 23, 2019

(65) Prior Publication Data

US 2021/0034522 A1    Feb. 4, 2021

(30) Foreign Application Priority Data

Jul. 31, 2019 (KR) .................... 10-2019-0093387

(51) Int. Cl.
*G06F 12/08* (2016.01)
*G06F 12/02* (2006.01)
*G06F 12/0815* (2016.01)

(52) U.S. Cl.
CPC ...... *G06F 12/0815* (2013.01); *G06F 12/0246* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 9,715,465 B2 | 7/2017 | Kim | |
| 2004/0186946 A1* | 9/2004 | Lee | G06F 12/0246 |
| | | | 711/103 |
| 2012/0144092 A1* | 6/2012 | Hsieh | G06F 12/023 |
| | | | 711/103 |
| 2012/0246390 A1* | 9/2012 | Kanai | G06F 1/1635 |
| | | | 711/103 |
| 2015/0019766 A1* | 1/2015 | Lin | G06F 3/0679 |
| | | | 710/53 |
| 2015/0193360 A1* | 7/2015 | Lu | G06F 13/24 |
| | | | 710/48 |
| 2018/0081590 A1* | 3/2018 | Farahani | G06F 13/1673 |
| 2018/0150225 A1 | 5/2018 | Chang et al. | |
| 2018/0335974 A1* | 11/2018 | Simionescu | G06F 12/0866 |

\* cited by examiner

*Primary Examiner* — Kaushikkumar M Patel
(74) *Attorney, Agent, or Firm* — IP & T Group LLP

(57) ABSTRACT

A storage device for outputting a program completion response before a program operation is completed includes a buffer memory for storing data from a host, a memory device for storing data from the buffer memory, and a memory controller for controlling the buffer memory and the memory device. The buffer memory stores the data according to mapping information. The memory controller includes a response controller for outputting a remapping request for changing mapping in the buffer memory, when the data and a storage request corresponding thereto are received, and outputting a storage completion response, when a remapping operation is completed, and a mapping controller for outputting, based on the remapping request, the mapping information on usable storage areas except an unusable area, by performing a remapping operation of changing an area in which the data is stored among the usable storage areas of the buffer memory to the unusable area.

20 Claims, 12 Drawing Sheets

FIG. 3

| INDEX | MAPPING |
|-------|---------|
| ID1   | BM1     |
| ID2   | BM2     |
| ID3   | BM3     |
| ⋮     | ⋮       |
| ID16  | BM16    |
| ID17  | BM17    |
| ID18  | BM18    |
| ID19  | BM19    |
| ⋮     | ⋮       |
| ID32  | BM32    |

MAIN_BM: ID1–ID16
RSVD_BM: ID17–ID32
BM1 → USED_BM

FIG. 4

| INDEX | MAPPING |
|---|---|
| ID1 | BM17 |
| ID2 | BM2 |
| ID3 | BM3 |
| ⋮ | ⋮ |
| ID16 | BM16 |
| ID17 | – |
| ID18 | BM18 |
| ID19 | BM19 |
| ⋮ | ⋮ |
| ID32 | BM32 |

ID1–ID16: MAIN_BM
ID17–ID32: RSVD_BM

FIG. 5

| INDEX | MAPPING |
|---|---|
| ID1 | BM17 |
| ID2 | BM2 |
| ID3 | BM3 |
| ⋮ | ⋮ |
| ID16 | BM16 |
| ID17 | BM1 |
| ID18 | BM18 |
| ID19 | BM19 |
| ⋮ | ⋮ |
| ID32 | BM32 |

MAIN_BM: ID1–ID16
RSVD_BM: ID17–ID32

STORAGE DEVICE AND OPERATING METHOD THEREOF

CROSS-REFERENCE TO RELATED APPLICATION

The present application claims priority under 35 U.S.C. § 119(a) to Korean patent application number 10-2019-0093387, filed on Jul. 31, 2019, which is incorporated herein by reference in its entirety.

BACKGROUND

Field of Invention

The present disclosure generally relates to an electronic device, and more particularly, to a storage device and an operating method thereof.

Description of Related Art

A storage device is a device configured to store data under the control of a host device such as a computer, a smart phone or a smart pad. The storage device includes a device configured to store data on a magnetic disk, such as a Hard Disk Drive (HDD), and a device configured to store data on a semiconductor memory, i.e., a nonvolatile memory, such as a Solid State Drive (SSD) or a memory card.

The storage device may include a memory device configured to store data and a memory controller configured to control the memory device. The memory device is classified into a volatile memory device and a nonvolatile memory device. The nonvolatile memory device includes a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like.

SUMMARY

Embodiments provide a storage device for outputting a program completion response before a program operation is completed, and an operating method of the storage device.

In accordance with an aspect of the present disclosure, there is provided a storage device including a buffer memory for storing data received from a host, a memory device for storing data received from the buffer memory, and a memory controller for controlling the buffer memory and the memory device, wherein the buffer memory stores the data according to mapping information, wherein the memory controller includes: a response controller configured to output a remapping request for changing mapping in the buffer memory, when the data and a storage request corresponding thereto are received, and output a storage completion response, when a remapping operation corresponding to the remapping request is completed; and a mapping controller configured to output, based on the remapping request, the mapping information on usable storage areas except an unusable area, by performing a remapping operation of changing an area in which the data is stored among the usable storage areas of the buffer memory to the unusable area.

In accordance with another aspect of the present disclosure, there is provided a method for operating a storage device including a buffer memory for storing data received from a host, a memory device for storing data received from the buffer memory, and a memory controller for controlling the buffer memory and the memory device, the method including: receiving data and a storage request corresponding thereto from the host; storing the data received from the host in the buffer memory according to mapping information; performing a remapping operation of changing an area in which the data is stored among usable storage areas of the buffer memory to an unusable area, when the data received from the host is stored in the buffer memory; generating remapping information, based on the remapping operation; and outputting a storage completion response, when the remapping information is generated.

In accordance with an aspect of the present disclosure, there is provided a memory system including a memory device for storing data received from a host and a memory controller. The memory controller includes: a buffer memory for temporarily storing the data, a data controller configured to control the data to be stored in the buffer memory according to mapping information, when the data and a storage request corresponding thereto are received from the host; a response controller configured to output a storage completion response of the data to the host, when a data storage operation of storing the data in the buffer memory is completed by the data controller; and a mapping controller configured to output the mapping information on remaining usable storage areas to the data controller by performing a remapping operation of changing an area in which the data is stored among usable storage areas of the buffer memory to an unusable area.

In accordance with another aspect of the present disclosure, there is provided a memory device including a first memory assigned as a main memory; a second memory assigned as a reserved memory; a memory device; and a control component. The control component is configured to: buffer, into the first memory, data provided along with a command from a host; respond to the command upon completion of the buffering; remap the first memory to the second memory to assign the second memory as the main memory; control the memory device to store therein the buffered data; and release the remap to assign the first memory as the reserved memory.

BRIEF DESCRIPTION OF THE DRAWINGS

Various embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 3 is a diagram illustrating a mapping table included in a mapping controller when data is stored in a buffer memory.

FIG. 4 is a diagram illustrating a remapped mapping table.

FIG. 5 is a diagram illustrating a mapping table after data received from a host is output to a memory device.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, various embodiments of the present disclosure will be described in detail with reference to the accompanying drawings in order for those skilled in the art to be able to readily implement the technical spirit of the present disclosure.

Figure 1:
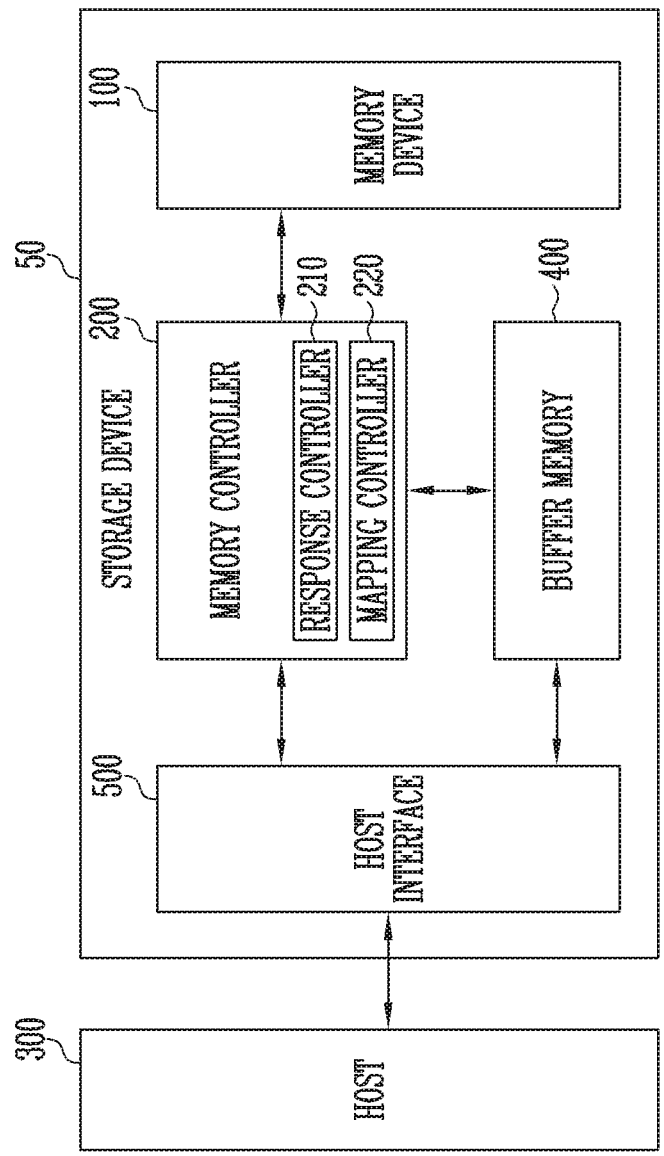
FIG. 1 is a block diagram illustrating a storage device.

FIG. 1 is a block diagram illustrating a storage device.

Referring to FIG. 1, the storage device 50 may include a memory device 100 and a memory controller 200.

The storage device 50 may be a device for storing data under the control of a host 300, such as a mobile phone, a smart phone, an MP3 player, a laptop computer, a desktop computer, a game console, a TV, a tablet PC or an in-vehicle infotainment.

The storage device 50 may be manufactured as any of various types of storage devices according to a host interface that is a communication scheme with the host 300. For example, the storage device 50 may be implemented with any of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any of various kinds of package types. For example, the storage device 50 may be manufactured as any of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells, and the plurality of memory cells may constitute a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

In an embodiment, the memory device 100 may be implemented in a two-dimensional array structure or three-dimensional array structure. Hereinafter, a case where the memory device 100 is implemented in the three-dimensional array structure is described as an embodiment, however the present disclosure is not limited to the three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, the memory device 100 may be operated using a Single Level Cell (SLC) scheme in which one data bit is stored in one memory cell. Alternatively, the memory device 100 may be operated using a scheme in which at least two data bits are stored in one memory cell. For example, the memory device 100 may be operated using a Multi-Level Cell (MLC) scheme in which two data bits are stored in one memory cell, a Triple Level Cell (TLC) scheme in which three data bits are stored in one memory cell, or a Quadruple Level Cell (QLC) scheme in which four data bits are stored in one memory cell.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation according to the received command. For example, when a program command is received, the memory device 100 may program data in the area selected by the address. When a read command is received, the memory device 100 may read data from the area selected by the address. When an erase command is received, the memory device 100 may erase data stored in the area selected by the address.

In an embodiment, a plurality of memory devices may be included in the storage device 50. The plurality of memory devices may have the same configuration.

In an embodiment, the storage device 50 may include a host interface 500. The host interface 500 may receive a command or data from the host 300. The command received from the host 300 may be a command instructing the memory device 100 to perform a program operation, a read operation, or an erase operation. In addition, the data received from the host 300 may be data programmed to the memory device 100. The host interface 500 may output, to the host 300, a response representing that an operation corresponding to the command received from the host 300 has been completed.

The host interface 500 may provide the command received from the host 300 to the memory controller 200, and provide the data received from the host 300 to a buffer memory 400.

Consequently, the host interface 500 may couple the storage device 50 and the host 300 to each other, and allow the storage 50 and the host 300 to exchange data with each other.

The memory controller 200 may include a response controller 210. The response controller 210 may receive a program command output from the host 300 through the host interface 500, and output a response to the received program command to the host interface 500. The program command output from the host 300 may be a storage request or storage command.

Conventionally, the memory controller 200 outputs a response to the program command to the host 300 after the memory device 100 completes a program operation corresponding to the program command. However, in the present disclosure, the memory controller 200 may output a response to the program command to the host 300 before data temporarily stored in the buffer memory 400 is transmitted to the memory device 100.

For example, after the response controller 210 receives the program command output from the host 300 through the host interface 500, the buffer memory 400 may receive host data output from the host 300 through the host interface 500.

When the host data is stored in the buffer memory 400, the response controller 210 may output a request to a mapping controller 220 to perform a remapping operation on the buffer memory 400. When the remapping operation on the buffer memory 400 is completed, the response controller 210 may output a program completion response to the host 300 through the host interface 500.

Consequently, since the response controller 210 outputs the program completion response to the host 300 after the remapping operation on the buffer memory 400 is completed, the response controller 210 may output the program completion response to the host 300 before host data corresponding to the program command is transmitted to the memory device 100.

The memory controller 200 may include the mapping controller 220. The mapping controller 220 may include a mapping table including mapping information of the buffer memory 400. The mapping table may include mapping information on main buffer memories and reserved buffer memories, before the host data output from the host 300 is received through the host interface 500. After the host data is received from the host 300, the mapping table may additionally include mapping information on used buffer memories in addition to the main buffer memories and the reserved buffer memories.

The mapping controller 220 may control mapping of a buffer memory through the mapping table.

In an embodiment, when host data received from the host 300 is stored in the buffer memory 400, the mapping controller 220 may remap, as a reserved buffer memory, a buffer memory corresponding to an index of an area in which the host data is stored. Subsequently, data received from the host 300 is again stored in the reserved buffer memory.

When the host data received from the host 300 is stored in the memory device 100, host data stored in a used buffer memory may be erased. After the host data is erased, the used buffer memory may become a reserved buffer memory (see FIG. 5) through release of the previous remapping between the taken memory and a reserved memory, which is performed when the host data is buffered into the taken memory (see FIG. 4).

The memory controller 200 may control overall operations of the storage device 50.

When a power voltage is applied to the storage device 50, the memory controller 200 may execute firmware (FW). When the memory device 100 is a flash memory device, the memory controller 200 may execute FW such as an FTL for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. Also, the memory controller 200 may store, in a buffer memory in the memory controller 200, a logical-physical address mapping table that establishes a mapping relationship between the LBA and the PBA.

The memory controller 200 may control the memory device 100 to perform a program operation, a read operation, an erase operation, or the like in response to a request from the host 300. For example, when a program request is received from the host 300, the memory controller 200 may change the program request into a program command, and provide the memory device 100 with the program command, a PBA, and data. When a read request is received together with an LBA from the host 300, the memory controller 200 may change the read request into a read command, select a PBA corresponding to the LBA, and then provide the memory device 100 with the read command and the PBA. When an erase request is received together with an LBA from the host 300, the memory controller 200 may change the erase request into an erase command, select a PBA corresponding to the LBA, and then provide the memory device 100 with the erase command and the PBA.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the storage device 50 may further include the buffer memory 400. The memory controller 200 may control data exchange between the host 300 and the buffer memory 400. Alternatively, the memory controller 200 may temporarily store system data for controlling the memory device 100 in the buffer memory 400. For example, the memory controller 200 may temporarily store data input from the host 300 in the buffer memory 400, and then transmit the data temporarily stored in the buffer memory 400 to the memory device 100.

In various embodiments, the buffer memory 400 may be used as a working memory or cache memory of the memory controller 200. The buffer memory 400 may store codes or commands executed by the memory controller 200. Alternatively, the buffer memory 400 may store data processed by the memory controller 200.

In another embodiment, the buffer memory 400 may be included in the memory controller 200. When the buffer memory 400 is included in the memory controller 200, the memory controller 200 may additionally include a data controller (not shown) configured to control data received from the host 300 to be stored in the buffer memory 400 according to mapping information.

In an embodiment, the buffer memory 400 may be implemented with a Dynamic Random Access Memory (DRAM) such as a Double Data Rate Synchronous DRAM (DDR SDRAM), a DDR4 SDRAM, a Low Power Double Data Rate 4 (LPDDR4) SDRAM, a Graphics Double Data Rate (GDDR) SDRAM, a Low Power DDR (LPDDR), or a Rambus Dynamic Random Access Memory (RDRAM), or a Static Random Access Memory (SRAM).

In various embodiments, the buffer memory 400 may be coupled to the storage device 50 at the outside of the storage device 50. Therefore, volatile memory devices 100 coupled to the storage device 50 at the outside of the storage device 50 may perform functions of the buffer memory 400.

In an embodiment, the memory controller 200 may control at least two memory devices 100. The memory controller 200 may control the memory devices according to an interleaving scheme to improve operational performance.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
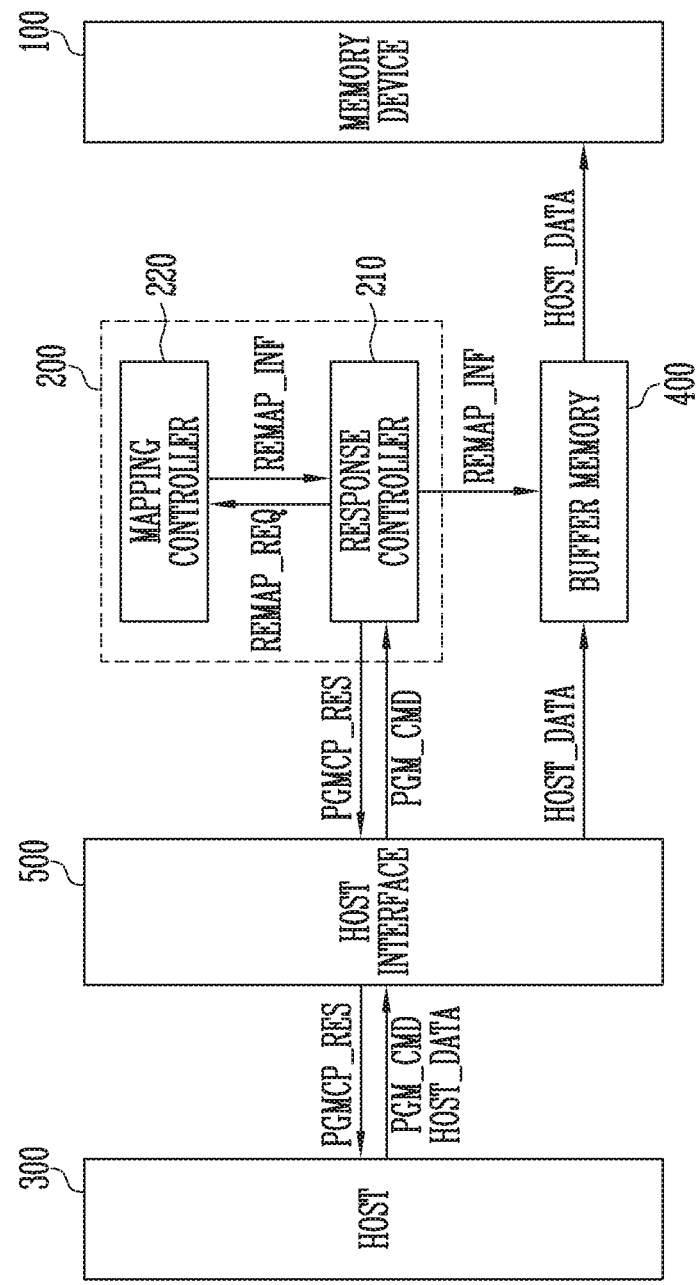
FIG. 2 is a diagram illustrating outputting of a program completion response and remapping.

FIG. 2 is a diagram illustrating outputting of a program completion response and remapping.

Referring to FIG. 2, the memory controller 200 shown in FIG. 2 may include the mapping controller 220 and the response controller 210. FIG. 2 illustrates a series of processes until the memory controller 200 shown in FIG. 2 receives a program command PGM_CMD from the host 300 through the host interface 500 and outputs a program completion response PGMCP_RES to the program command PGM_CMD to the host 300 through the host interface 500. The program command PGM_CMD output from the host 300 may be a storage request or storage command, and the program completion response PGMCP_RES may be a storage completion response.

In an embodiment, the response controller 210 may receive a program command PGM_CMD from the host 300 through the host interface 500. The program command PGM_CMD may be a command instructing host data HOST_DATA received from the host 300 to be programmed to the memory device 100.

The response controller 210 may output a program completion response RGMCP_RES before the host data HOST_DATA is transmitted to the memory device 100 after the program command PGM_CMD is received. Hereinafter, a method in which the response controller 210 outputs the program completion response PGMCP_RES will be described.

In an embodiment, the buffer memory 400 may receive host data HOST_DATA from the host 300 through the host interface 500. The host data HOST_DATA may be data programmed to the memory device 100.

The buffer memory 400 may be configured with a plurality of memories. For example, the buffer memory 400 may be configured with a first buffer memory and a second buffer memory. The first and second buffer memories may transmit or receive data to or from each other. Data stored in the first buffer memory or the second buffer memory may be output to the memory device 100 to be programmed to the memory device 100.

In another embodiment, the buffer memory 400 may be configured with a larger number of buffer memories.

In another embodiment, the buffer memory 400 may be included in the memory controller 200. When the buffer memory 400 is included in the memory controller 200, the memory controller 200 may additionally include a data controller (not shown) configured to control data received from the host 300 to be stored in the buffer memory 400 according to mapping information.

The buffer memory 400 may be configured with main buffer memories and reserved buffer memories, before data received from the host 300 is stored through the host interface 500. The main buffer memory may be a memory corresponding to an area in which host data HOST_DATA to be received from the host 300 is to be stored, and the reserved buffer memory may be a memory corresponding to an area to be allocated as a main buffer memory when the main buffer memory becomes a used buffer memory. The used buffer memory may be a buffer memory in which data is stored among the main buffer memories. Numbers of main buffer memories and reserved buffer memories may be predetermined.

In an embodiment, when host data HOST_DATA received from the host 300 is stored in a main buffer memory, the corresponding buffer memory may be designated as a used buffer memory. When the host data HOST_DATA is stored in the main buffer memory, a reserved buffer memory may be allocated as a main buffer memory.

In an embodiment, when host data HOST_DATA received from the host 300 through the host interface 500 is stored in the buffer memory 400, the response controller 210 may provide a remapping request REMAP_REQ to the mapping controller 220. The remapping request REMAP_REQ may be a request for changing mapping information of a mapping table included in the mapping controller 220.

The mapping controller 220 may include the mapping table. The mapping table may include mapping information on the buffer memory 400. For example, the mapping table may include mapping information that is information on buffer memories mapped to indices. The indices may correspond to groups obtained by dividing the buffer memory 400 in a specific unit (e.g., 4K). Some of the indices before data is stored in the buffer memory 400 may be mapped to main buffer memories, and other some of the indices may be mapped to reserved buffer memories.

In an embodiment, when host data HOST_DATA received from the host 300 is stored in the buffer memory 400, the mapping controller 220 may receive a remapping request REMAP_REQ from the response controller 210. The mapping controller 220 may remap the buffer memory 400 corresponding to an index in response to the remapping request REMAP_REQ.

Specifically, an index of a used buffer memory that is a buffer memory in which the host data HOST_DATA is stored among main buffer memories may be remapped to a reserved buffer memory. When the mapping controller 220 remaps the index of the used buffer memory to the reserved buffer memory, data received subsequently from the host 300 may be stored in the reserved buffer memory.

After the mapping controller 220 performs a remapping operation, the mapping controller 220 may output, to the response controller 210, remapping information REMAP_INF including information on a remapped index and the buffer memory 400 corresponding to the remapped index. When the response controller 210 receives the remapping information REMAP_INF, the response controller 210 may output a program completion response PGMCP_RES to the host 300 through the host interface 500 in response to a program command PGM_CMD. That is, before a program operation corresponding to the program command PGM_CMD is completed, the response controller 210 may output the program completion response PGMCP_RES to the host 300.

Also, the response controller 210 may output remapping information REMAP_INF to the buffer memory 400. The buffer memory 400 may store, in the buffer memory 400, host data HOST_DATA received subsequently through the host interface 500, based on the remapping information REMAP_INF. That is, data received from the host 300 may be stored in a main buffer memory.

In an embodiment, the mapping controller 220 may determine whether data stored in a used buffer memory has been stored in the memory device 100. When the data stored in the used buffer memory is stored in the memory device 100, the used buffer memory may be erased. On the contrary, the used buffer memory may not be erased until the data stored in the used buffer memory is stored in the memory device 100.

When the used buffer memory is erased, the mapping controller 220 may control the erased used buffer memory to be mapped to any of indices of reserved buffer memories.

FIG. 3 is a diagram illustrating a mapping table included in the mapping controller when data is stored in the buffer memory.

Referring to FIG. 3, FIG. 3 illustrates a mapping table before host data received from the host (300 shown in FIG. 2) through the host interface (500 shown in FIG. 2) is stored in the buffer memory (400 shown in FIG. 2). In FIG. 3, a case where the buffer memory (400 shown in FIG. 2) is configured with first to thirty-second buffer memories BM1 to BM32 is described.

A first column shown in FIG. 3 represents indices INDEX obtained by dividing the buffer memory by a unit where data is stored, and a second column shown in FIG. 3 represents mapping MAPPING of the buffer memory.

In an embodiment, the buffer memory may receive host data from the host through the host interface. The buffer memory may output the received host data to the memory device (100 shown in FIG. 2). The memory device may store the received host data in a memory cell.

Before the buffer memory receives the host data, the buffer memory may be configured with main buffer memories MAIN_BM and reserved buffer memories RSVD_BM. The main buffer memories MAIN_BM may correspond to an area in which data received from the host is stored, and the reserved buffer memories RSVD_BM may correspond to an area allocated as a main buffer memory MAIN_BM after the data received from the host is stored in the main buffer memory MAIN_BM. Numbers of main buffer memories MAIN_BM and reserved buffer memories RSVD_BM in the buffer memory may be predetermined.

Referring to FIG. 3, first to thirty-second indices ID1 to ID32 may be respectively mapped to the first to thirty-second buffer memories BM1 to BM32. The first to sixteenth buffer memories BM1 to BM16 may be main buffer memories MAIN_BM, and the seventeenth to thirty-second buffer memories BM17 to BM32 may be reserved buffer memories RSVD_BM. The main buffer memory may be a memory corresponding to an area in which host data to be received from the host is to be stored, and the reserved buffer memory may be a memory corresponding to an area allocated as a main buffer memory, when a main buffer memory in which data is stored becomes a used buffer memory. Numbers of main buffer memories and reserved buffer memories may be predetermined.

In an embodiment, when the buffer memory receives data from the host, the received data may be sequentially stored in the buffer memories from the first buffer memory BM1 mapped to the first index ID1.

When the data received from the host is stored in the first buffer memory BM1 mapped to the first index ID1, the first buffer memory BM1 may become a used buffer memory USED_BM. That is, any data received from the host cannot be stored in the first buffer memory BM1.

When the first buffer memory BM1 becomes the used buffer memory USED_BM, the mapping controller (220 shown in FIG. 2) may perform a remapping operation to secure a main buffer memory MAIN_BM. The remapping operation will be described in more detail with reference to FIG. 4.

FIG. 4 is a diagram illustrating a remapped mapping table.

Referring to FIGS. 3 and 4, FIG. 4 illustrates a mapping table obtained by remapping the mapping table shown in FIG. 3. That is, FIG. 4 illustrates a mapping table after data received from the host is stored in the buffer memory (400 shown in FIG. 2).

A first column shown in FIG. 4 represents indices INDEX obtained by dividing the buffer memory by a unit where data is stored, and a second column shown in FIG. 4 represents mapping MAPPING of the buffer memory.

In an embodiment, when data received from the host is stored in the first buffer memory BM1 mapped to the first index ID1, the first buffer memory BM1 may become a used buffer memory USED_BM. When the first buffer memory BM1 mapped to the first index ID1 becomes the used buffer memory USED_BM, it is necessary to secure a main buffer memory MAIN_BM. In order to secure a main buffer memory MAIN_BM, the mapping controller (220 shown in FIG. 2) may perform a remapping operation.

After the mapping controller receives a remapping request from the response controller (210 shown in FIG. 2), the mapping controller may perform a remapping operation corresponding to the remapping request. In an embodiment, the mapping controller may map the first index ID1 to any of reserved buffer memories RSVD_BM. That is, the mapping controller may control an index of the used buffer memory USED_BM to the reserved buffer memory RSVD_BM.

In FIG. 4, the seventeenth buffer memory BM17 included in the reserved buffer memories RSVD_BM may be mapped to the first index ID1, instead of the first buffer memory BM1 as the used buffer memory USED_BM. When the seventeenth buffer memory BM17 is mapped to the first index ID1, the seventeenth buffer memory BM17 may become a main buffer memory MAIN_BM. Thus, the main buffer memory MAIN_BM can be secured through this remapping operation.

When the seventeenth buffer memory BM17 becomes a main buffer memory MAIN_BM, mapping of the seventeenth index ID17 may be deleted. That is, since one buffer memory can be mapped to one index, the mapping of the seventeenth index ID17 is deleted, and only mapping of the seventeenth index ID17 corresponding to the first index ID1 may be maintained.

When the first index ID1 is mapped to the seventeenth buffer memory BM17, and the mapping of the seventeenth index ID17 is deleted, a number of main buffer memories MAIN_BM may be maintained as a predetermined number (16), but a number of reserved buffer memories RSVD_BM may be decreased (15).

Therefore, when a reserved buffer memory RSVD_BM is allocated as a main buffer memory MAIN_BM, and mapping of an index corresponding to the reserved buffer memory RSVD_BM is deleted, the number of reserved buffer memories RSVD_BM may be insufficient. Accordingly, it is necessary to secure the insufficient number of reserved buffer memories RSVD_BM.

Hereinafter, a method for securing an insufficient number of reserved buffer memories RSVD_BM is described.

FIG. 5 is a diagram illustrating a mapping table after data received from the host is output to the memory device.

A first column shown in FIG. 5 represents indices INDEX obtained by dividing the buffer memory by a unit where data is stored, and a second column shown in FIG. 5 represents mapping MAPPING of the buffer memory.

Referring to FIGS. 4 and 5, FIG. 5 illustrates a mapping table after the first buffer memory BM1 is erased. That is, when host data stored in the first buffer memory BM1 is transmitted to the memory device (100 shown in FIG. 2), the first buffer memory BM1 does not store the host data anymore. Hence the first buffer memory BM1 may be erased. FIG. 5 illustrates a mapping relationship between each index and a buffer memory after the first buffer memory BM1 is erased.

In an embodiment, data received from the host (300 shown in FIG. 2) through the host interface (500 shown in FIG. 2) may be stored in the first buffer memory BM1. When the data is stored in the first buffer memory BM1, the first buffer memory BM1 may become a used buffer memory USED_BM. When the first buffer memory BM1 becomes the used buffer memory USED_BM, the first buffer memory BM1 may be excluded from the main buffer memories MAIN_BM, and cannot become a main buffer memory MAIN_BM or reserved buffer memory RSVD_BM, until before the data stored in the first buffer memory BM1 is output to the memory device.

In an embodiment, the mapping controller (220 shown in FIG. 2) may determine whether the data stored in the used buffer memory USED_BM has been transmitted to the memory device. When the data stored in the used buffer memory USED_BM is transmitted to the memory device (100 shown in FIG. 2), the used buffer memory USED_BM may be erased. On the contrary, when the data stored in the used buffer memory USED_BM is not yet transmitted to the memory device, the used buffer memory USED_BM may not be erased before the data stored in the used buffer memory USED_BM is transmitted to the memory device.

For example, data stored in the first buffer memory BM1 as the used buffer memory USED_BM may be output to the memory device. When the data stored in the first buffer memory BM1 is output to the memory device, it may be unnecessary to retain the data stored in the first buffer memory BM1. That is, since a program operation has been completed, the first buffer memory BM1 may be allocated to store another data. Therefore, after the data stored in the first buffer memory BM1 is transmitted to the memory device, the data stored in the first buffer memory BM1 may be erased.

When the data stored in the first buffer memory BM1 (i.e., the used buffer memory) is erased, the first buffer memory BM1 may be allocated as a reserved buffer memory RSVD_BM through release of the previous remapping between the taken memory BM1 and the reserved memory BM17, which is performed when the host data is buffered into the taken memory BM1 (see FIG. 4). That is, the first buffer memory BM1 may become a reserved buffer memory RSVD_BM and may be ready to be allocated as a main buffer memory MAIN_BM. Subsequently, when the first buffer memory BM1 is allocated as the main buffer memory MAIN_BM, data received from the host may be stored in the buffer memory BM1 which is allocated again as a used buffer memory.

In an embodiment, since indices corresponding to the reserved buffer memories RSVD_BM may be the seventeenth to thirty-second indices ID17 to ID32 and the vacant allocation of the seventeenth index ID17 is released due to the release of the remapping relationship between the seventeenth buffer memory BM17 and the first buffer memory BM1 (see FIG. 4), a mapping of the seventeenth index ID17 to the first buffer memory BM1 may be formed. When the first buffer memory BM1 is mapped to the seventeenth index ID17, the first buffer memory BM1 may be allocated as a main buffer memory MAIN_BM.

Figure 6:
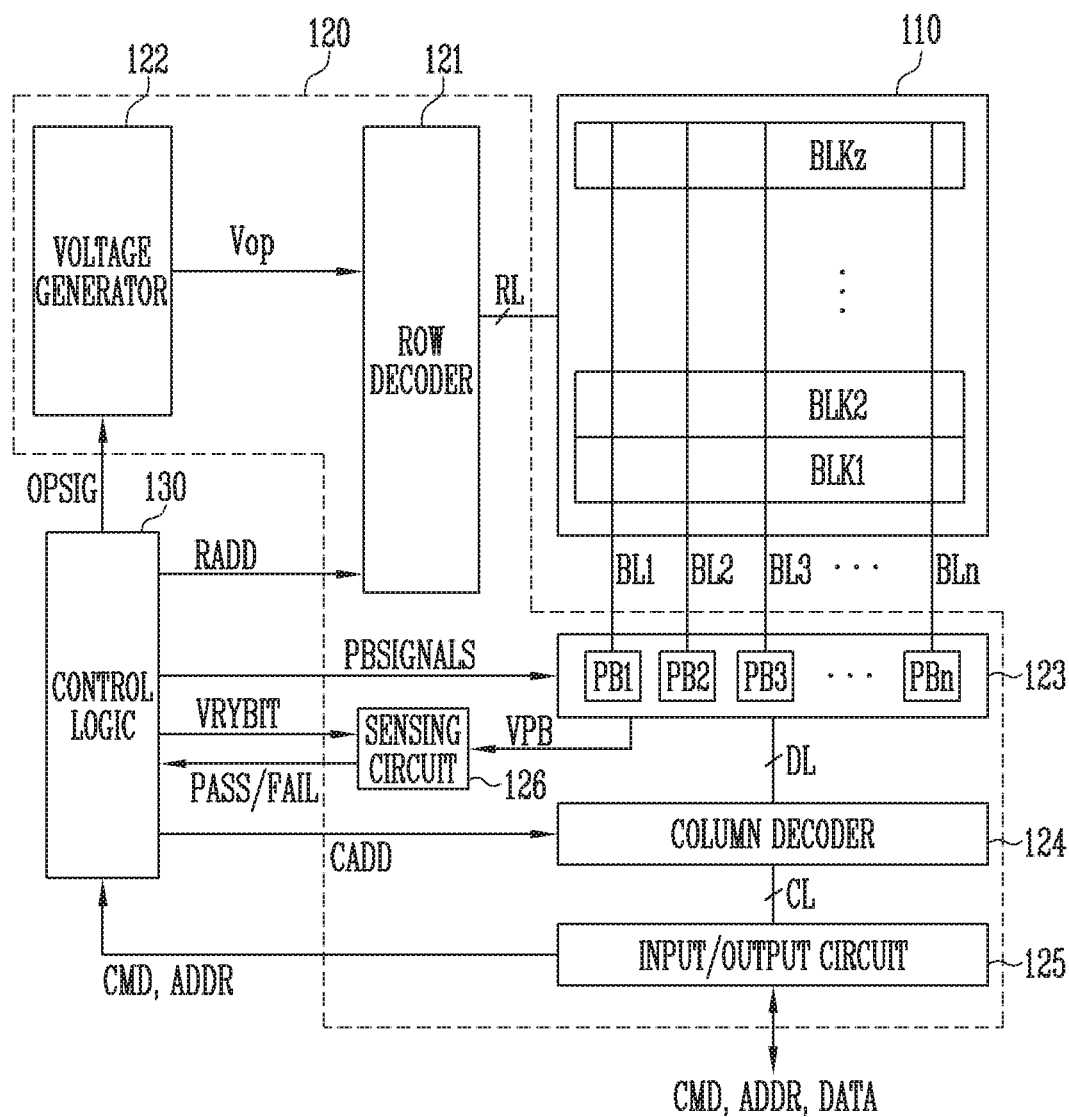
FIG. 6 is a diagram illustrating a structure of the memory device shown in FIG. 1.

FIG. 6 is a diagram illustrating a structure of the memory device shown in FIG. 1.

Referring to FIG. 6, the memory device 100 may include a memory cell array 100, a peripheral circuit 120, and a control logic 130.

The memory cell array 110 includes a plurality of memory blocks BLK1 to BLKz. The plurality of memory blocks BLK1 to BLKz are coupled to a row decoder 121 through row lines RL. The plurality of memory blocks BLK1 to BLKz are coupled to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells coupled to the same word line may be defined as one page. Therefore, one memory block may include a plurality of pages.

The row lines RL may include at least one source select line, a plurality of word lines, and at least one drain select line.

Each of the memory cells included in the memory cell array 110 may be programmed or read using a Single Level Cell (SLC) scheme in which one data bit is stored in one memory cell, a Multi-Level Cell (MLC) scheme in which two data bits are stored in one memory cell, a Triple Level Cell (TLC) scheme in which three data bits are stored in one memory cell, or a Quadruple Level Cell (QLC) scheme in which four data bits are stored in one memory cell.

The peripheral circuit 120 may perform a program operation, a read operation or an erase operation on a selected region of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, the voltage generator 122, the page buffer group 123, a column decoder 124, an input/output circuit 125, and a sensing circuit 126.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 decodes row address RADD received from the control logic 130. The row decoder 121 selects at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage having a level higher than that of the verify voltage to the unselected word lines.

In a read operation, the row decoder 121 may apply a read voltage to the selected word line, and apply a read pass voltage having a level higher than that of the read voltage to the unselected word lines.

In an embodiment, an erase operation of the memory device 100 is performed in a memory block unit. In the erase operation, the row decoder 121 may select one memory block according to the decoded address. In the erase operation, the row decoder 121 may apply a ground voltage to word lines coupled to the selected memory blocks.

The voltage generator 122 operates under the control of the control logic 130. The voltage generator 122 generates a plurality of voltages by using an external power voltage supplied to the memory device 100. Specifically, the voltage generator may generate various operating voltages Vop used in program, read, and erase operations in response to an operation signal OPSIG. For example, the voltage generator 122 may generate a program voltage, a verify voltage, a pass voltage, a read voltage, an erased voltage, and the like under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage.

For example, the voltage generator 122 may include a plurality of pumping capacitors for receiving the internal power voltage, and generate the plurality of voltages by selectively activating the plurality of pumping capacitors under the control of the control logic 130.

The plurality of generated voltages may be supplied to the memory cell array 110 by the row decoder 121.

The page buffer group 123 includes first to nth page buffers PB1 to PBn. The first to nth page buffers PB1 to PBn are coupled to the memory cell array 110 respectively through first to nth bit lines BL1 to BLn. The first to nth bit lines BL1 to BLn operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense voltages or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page are programmed according to the transferred data DATA. In a program verify operation, the first to nth page buffers PB1 to PBn read page data by sensing voltages or currents received from the selected memory cells through the first to nth bit lines BL1 to BLn.

In a read operation, the first to nth page buffers PB1 to PBn read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn or apply an erase voltage.

The column decoder 124 may communicate data between the input/output circuit 125 and the page buffer group 123 in response to a column address CADD. For example, the column decoder 124 may communicate data with the first to nth page buffers PB1 to PBn through data lines EL, or communicate data with the input/output circuit 125 through column lines CL.

The input/output circuit 125 may transfer a command CMD and an address ADDR, which are received from the memory controller (200 shown in FIG. 1), to the control logic 130, or exchange data DATA with the column decoder 124.

In a read operation or verify operation, the sensing circuit 126 may generate a reference current in response to an allow bit VRYBIT signal, and output a pass or fail signal PASS/FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR. Also, the control logic 130 may determine whether the verify operation has passed or failed in response to the pass or fail signal PASS or FAIL.

Each of the memory cells included in the memory cell array 110 may be programmed to any one program state among a plurality of program states according to data stored therein. A target program state of a memory cell may be determined as any one of the plurality of program states according to data stored in the memory cell.

Figure 7:
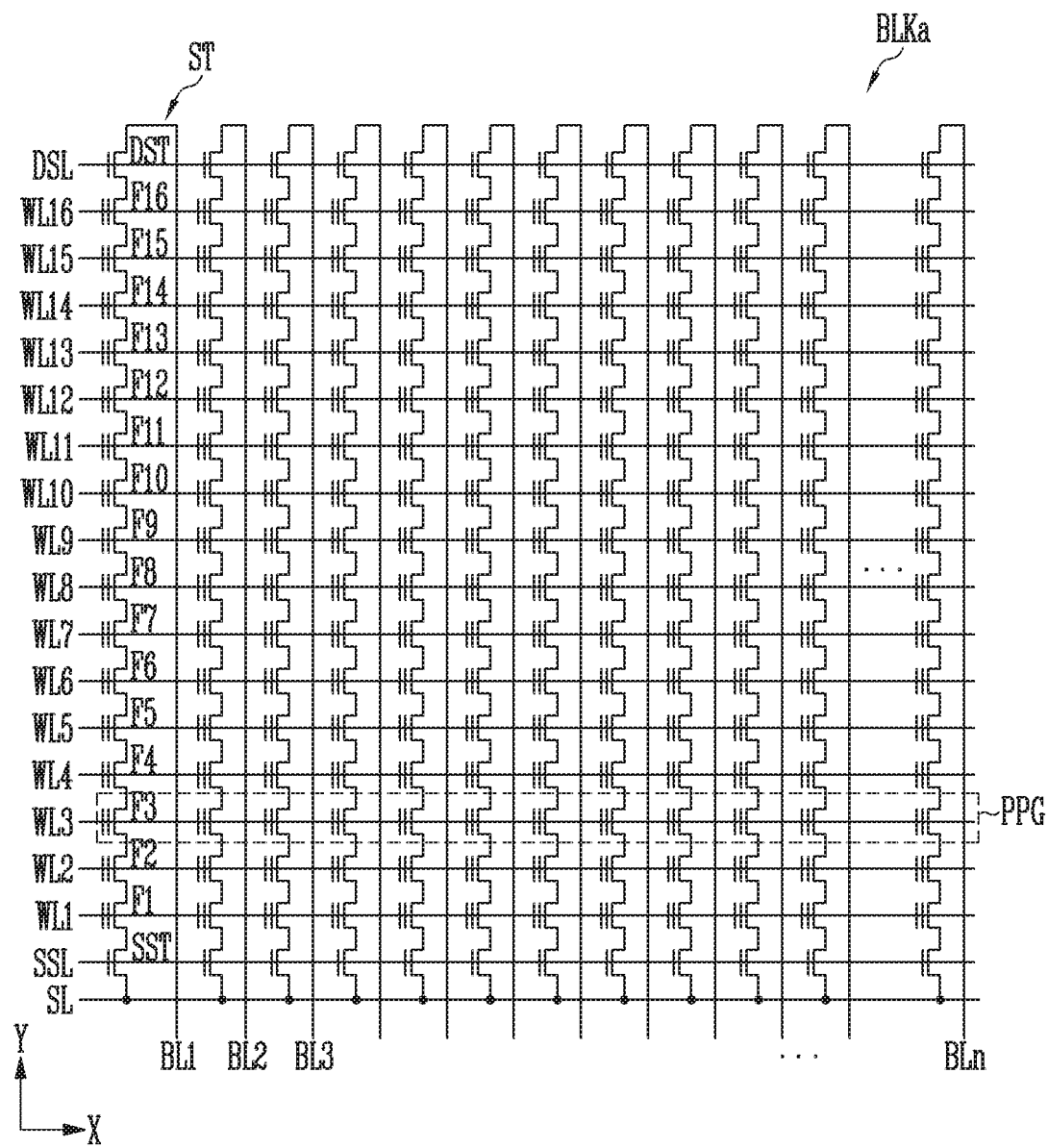
FIG. 7 is a diagram illustrating a memory block.

FIG. 7 is a diagram illustrating a memory block.

Referring to FIGS. 6 and 7, FIG. 7 is a circuit diagram illustrating any one memory block BLKa among the plurality of memory blocks BLK1 to BLKz included in the memory cell array 110 shown in FIG. 6.

In the memory block BLKa, a first select line, word lines, and a second select line, which are arranged in parallel, may be coupled to each other. For example, the word lines may be arranged in parallel between the first and second select lines. The first select line may be a source select line SSL, and the second select line may be a drain select line DSL.

More specifically, the memory block BLKa may include a plurality of strings coupled between bit lines BL1 to BLn and a source line SL. The bit lines BL1 to BLn may be respectively coupled to the strings, and the source line SL may be commonly coupled to the strings. The strings may be configured identical to one another, and therefore, a string ST coupled to a first bit line BL1 will be described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and memory cells of which number is greater than that of the memory cells F1 to F16 shown in the drawing may be included in the one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST included in different strings may be coupled to the source select line SSL, and gates of drain select transistors DST included in different strings may be coupled to the drain select line DSL. Gates of the memory cells F1 to F16 may be coupled to a plurality of word lines WL1 to WL16. A group of memory cells coupled to the same word line among memory cells included in different strings may be referred to as a physical page PPG. Therefore, physical pages corresponding to the number of the word lines WL1 to WL16 may be included in the memory block BLKa.

One memory cell may store data of one bit. The memory cell is generally referred to as a single level cell (SLC). One physical page PG may store one logical page (LPG) data. The one LPG data may include data bits of which number corresponds to that of cells included in one physical page PPG. Alternately, one memory cell MC may store data of two or more bits. The memory cell is generally referred to as a multi-level cell (MLC). One physical page PPG may store two or more LPG data.

In general, an MLC has meant a memory cell for storing data of two bits. However, as the number of bits of data stored in one memory cell increases, MLC may also be referred to as a memory cell for storing data of two or more bits of data. A memory cell for storing data of three or more bits is referred to as a triple level cell (TLC), and a memory cell for storing data of four or more bits is referred to as a quadruple level cell (QLC). Besides, memory cells for storing data of a plurality of bits have been developed, and this embodiment may be applied to memory systems in which data of two or more bits are stored.

In another embodiment, each of the plurality of memory blocks may have a three-dimensional structure. Each memory block may include a plurality of memory cells stacked on a substrate. The plurality of memory cells may be arranged along +X, +Y, and +Z directions.

Figure 8:
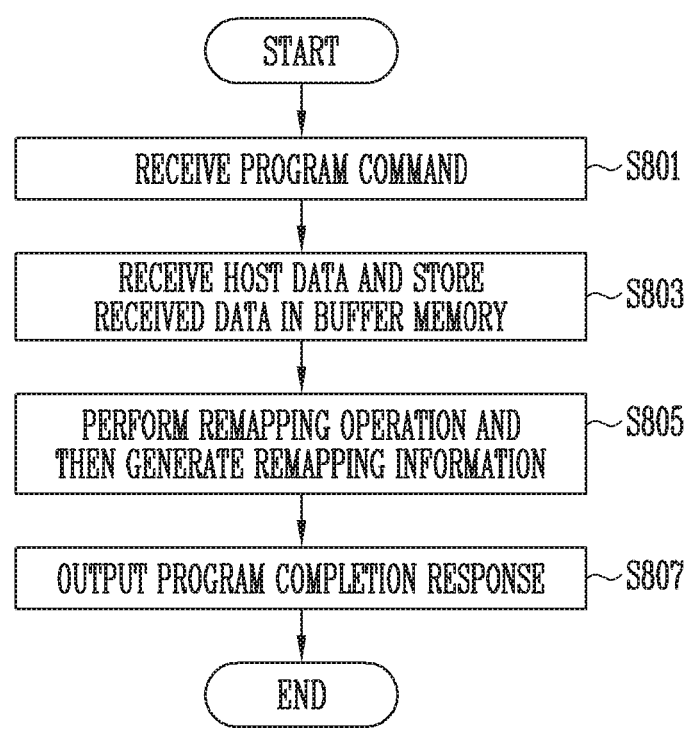
FIG. 8 is a diagram illustrating an operation of the storage device in accordance with an embodiment of the present disclosure.

FIG. 8 is a diagram illustrating an operation of the storage device in accordance with an embodiment of the present disclosure.

Referring to FIG. 8, in step S801, the memory controller may receive a program command from the host through the host interface. The program command may be a command instructing data received from the host to be programmed to the memory device. The memory controller may output a program completion response to the host in response to the program command. The program command output from the host may be a storage request or storage command, and the program completion response may be a storage completion response.

In step S803, when host data is received from the host, the main buffer memory may temporarily store the received data. In an embodiment, the host data received from the host may be program data to be programmed to the memory device. That is, the main buffer memory may receive data to be programmed to the memory device from the host through the host interface, and may temporarily store the received data before the main buffer memory transmits the received data to the memory device.

When the host data is stored in the main buffer memory, the memory controller may perform a remapping operation in accordance with the above-described embodiment (see FIG. 4) and then generate remapping information (S805). The remapping operation may be an operation of resetting mapping of the main buffer memory and the reserved buffer memory.

In an embodiment, the memory controller may set a main buffer memory in which the host data is stored as a used buffer memory. Subsequently, an index corresponding to the used buffer memory may be remapped as a reserved buffer memory. This is for the purpose of securing a main buffer memory.

When the remapping operation is completed, the memory controller may generate remapping information including information on an index remapped to a reserved buffer memory and the reserved buffer memory having a mapping relationship with the index. Data received from the host may be stored in the reserved buffer memory instead of the used buffer memory, based on the remapping information.

When the remapping information is generated, the memory controller may output a program completion response to the host (S807). That is, the memory controller may output the program completion response to the host before the memory controller transmits the data received from the host to the memory device.

Consequently, the memory controller may output the program completion response, after the memory controller secures a virtual buffer memory through the remapping operation of the buffer memory.

Figure 9:
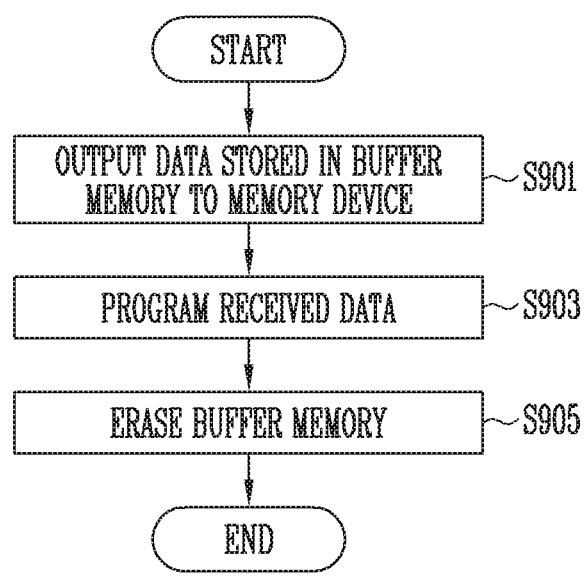
FIG. 9 is a diagram illustrating an operation of the storage device in accordance with an embodiment of the present disclosure.

FIG. 9 is a diagram illustrating an operation of the storage device in accordance with an embodiment of the present disclosure.

Referring to FIG. 9, in step S901, after the memory controller outputs the program completion response (S807 shown in FIG. 8), the memory controller may output data stored in the used buffer memory to the memory device. The data stored in the used buffer memory may be host data received from the host. Consequently, the data stored in the used buffer memory may be output to the memory device.

The memory device may receive data from the used buffer memory, and program the received data (S903). After the memory device completes a program operation, the memory controller may output a program completion response to the host. However, in the present disclosure, the program completion response may be output to the host before the data is transmitted to the memory device.

When the data stored in the used buffer memory is programmed to the memory device, the used buffer memory may be erased (S905). When the data stored in the used buffer memory is programmed to the memory device, the used buffer memory may be erased and may become a reserved buffer memory (see FIG. 5) such that another data is stored in the reserved buffer memory.

Figure 10:
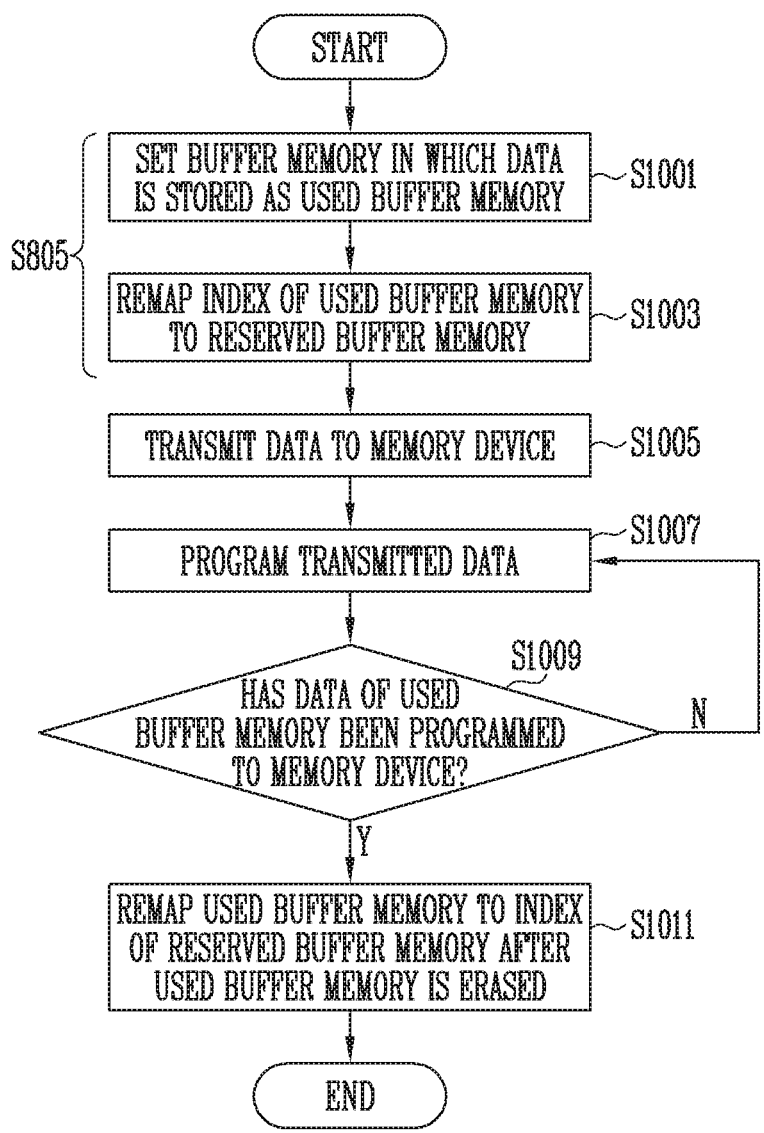
FIG. 10 is a diagram illustrating an operation of the storage device in accordance with an embodiment of the present disclosure.

FIG. 10 is a diagram illustrating an operation of the storage device in accordance with an embodiment of the present disclosure.

Referring to FIG. 10, in step S1001, the memory controller may set a buffer memory in which data is stored as a used buffer memory.

In an embodiment, the buffer memory may be configured with main buffer memories and reserved buffer memories. The main buffer memory may be a memory corresponding to an area in which data received from the host is to be stored, and the reserved buffer memory may be a memory corresponding to an area to be allocated as a main buffer memory when data is stored in the main buffer memory.

When data received from the host is stored in a main buffer memory, the buffer memory in which the data is stored may be set as a used buffer memory. When the buffer memory is set as the used buffer memory, the used buffer memory may be excluded from the main buffer memories.

When a buffer memory is changed from a main buffer memory to a used buffer memory, an index of the used buffer memory may be remapped to a reserved buffer memory (S1003). That is, when the main buffer memory is changed to the used buffer memory, it is necessary to secure a main buffer memory in which data is to be stored, and therefore, an index of the used buffer memory may be mapped to a reserved buffer memory. When the index of the used buffer memory is mapped to the reserved buffer memory, the reserved buffer memory may be allocated as a main buffer memory. When a remapping operation is completed, the memory controller may output a program completion response to the host.

The memory controller may transmit data stored in the used buffer memory to the memory device in response to a program command received from the host (S1005). That is, the data stored in the used buffer memory may be output to the memory device to program data temporarily stored in the used buffer memory. The memory device may program the data transmitted from the used buffer memory (S1007).

Subsequently, an operation for securing a reserved buffer memory may be performed.

In an embodiment, it may be determined whether the data of the used buffer memory has been programmed to the memory device (S1009).

When the data of the used buffer memory is not programmed to the memory device (N at step S1009), the memory device may return to step S1007 and re-program data in a predetermined program loop.

However, when the data of the used buffer memory is programmed to the memory device (Y at step S1009), an operation for storing another data in a used buffer memory may be performed. Therefore, a used buffer memory may be erased, and the erased used buffer memory may be allocated as a reserved buffer memory (S1011). That is, when the used buffer memory is erased, the used buffer memory may be remapped to an index corresponding to a reserved buffer memory.

Figure 11:
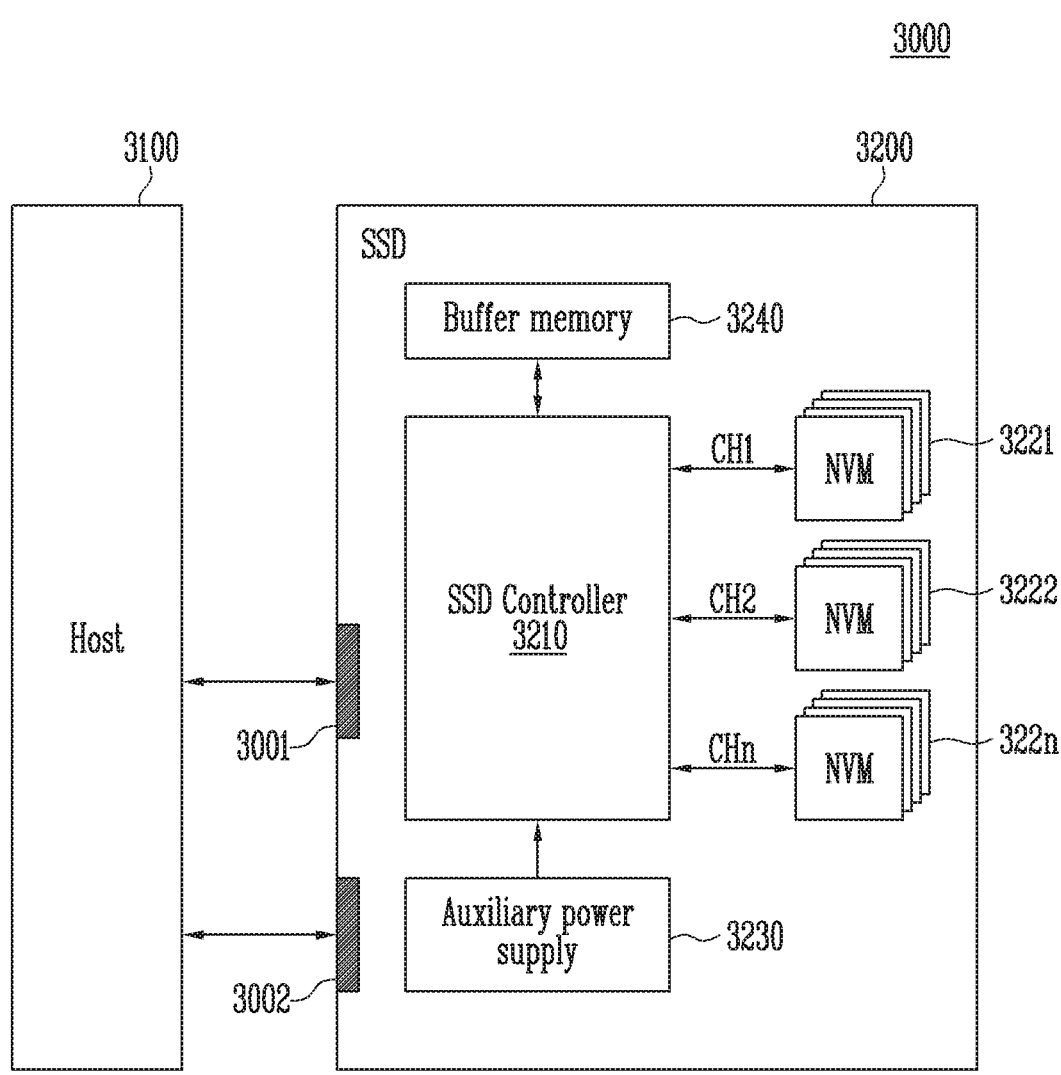
FIG. 11 is a block diagram illustrating a Solid State Drive (SSD) system to which the storage device is applied in accordance with an embodiment of the present disclosure.

FIG. 11 is a block diagram exemplarily illustrating a Solid State Drive (SSD) system to which the storage device is applied in accordance with an embodiment of the present disclosure.

Referring to FIG. 11, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The SSD controller 3210 may output a program completion response to the host 3100, before data received from the host 3100 is transmitted to the plurality of flash memories 3221 to 322n. The SSD controller 3210 may perform a remapping operation on the buffer memory 3240 to output the program completion response to the host 3100 before the data is transmitted to the plurality of flash memories 3221 to 322n. The remapping operation may be an operation of mapping, to another buffer memory area, an index mapped to an area in which data is stored among areas of the buffer memory 3240. When the remapping operation is completed, the SSD controller 3210 may output the program completion response to the host 3100.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

In an embodiment, the buffer memory 3240 may store data received from the host 3100, based on remapping information received from the SSD controller 3210. That is, the SSD controller 3210 may output a program completion response to the host 1300 when an area of the buffer memory 3240, which data received from the host 3100 is to be stored, is secured.

Figure 12:
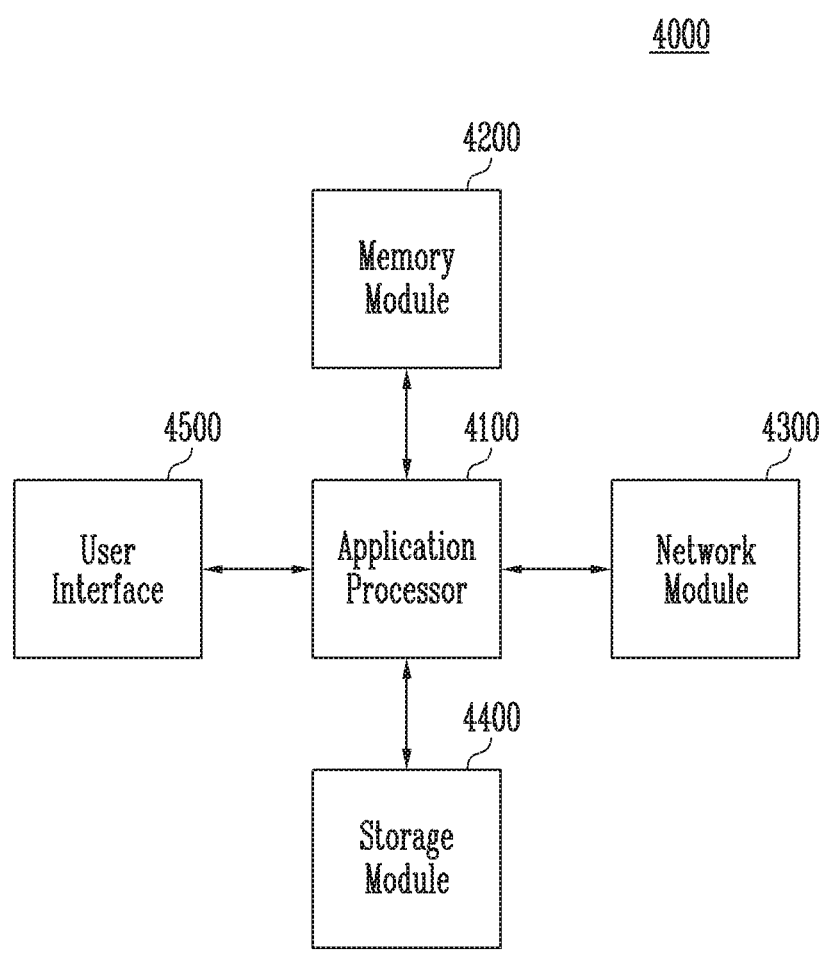
FIG. 12 is a block diagram illustrating a user system to which the storage device is applied in accordance with an embodiment of the present disclosure.

FIG. 12 is a block diagram exemplarily illustrating a user system to which the storage device is applied in accordance with an embodiment of the present disclosure.

Referring to FIG. 12, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The application processor 4100 may output a program completion response to a host, before data received from the host is transmitted to the storage module 4400. The application processor 4100 may perform a remapping operation on the memory module 4200 to output the program completion response to the host before the data is transmitted to the storage module 4400. The remapping operation may be an operation of mapping, to another buffer memory area, an index mapped to an area in which data is stored among areas of the memory module 4200. When the remapping operation is completed, the application processor 4100 may output the program completion response to the host.

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

In an embodiment, the memory module 4200 may store data received from the host, based on remapping information received from the application processor 4100. That is, the application processor 4100 may output a program completion response to the host 1300 when an area of the memory module 4200, which data received from the host 3100 is to be stored, is secured.

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIGS. 6 and 7. The storage module 4400 may operate identically to the storage device 50 described with reference to FIG. 1.

In an embodiment, the storage module 4400 may determine whether ROM data stored in prediction blocks respectively included in a plurality of planes are the same or whether ROM data stored in prediction blocks respectively included in a plurality of planes and ROM data stored in a ROM in the storage module 4400 may be the same. When the ROM data are not all the same, the storage module 4400 may determine a majority of ROM data, and perform an operation for correcting an error occurring in a minority of ROM data or replacing the minority of ROM data with the majority of ROM data.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, the memory controller outputs a program completion response before data is transmitted to the memory device, so that the speed of a program operation can be increased.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A storage device comprising:
   a buffer memory for storing data received from a host;
   a memory device for storing data received from the buffer memory; and
   a memory controller for controlling the buffer memory and the memory device,
   wherein the buffer memory stores the data according to mapping information,
   wherein the memory controller includes:
   a response controller configured to output a remapping request for changing mapping in the buffer memory when the data and a storage request corresponding thereto are received, and output a storage completion response after an indexing of a remapping operation to a reserved buffer memory corresponding to the remapping request is completed and before transmission of the data from the buffer memory; and a mapping controller configured to output, based on the remapping request, the mapping information on usable storage areas except an unusable area by performing a remapping operation of changing an area in which the data is stored among the usable storage areas of the buffer memory to the unusable area.

2. The storage device of claim 1, wherein the buffer memory is divided into a main buffer memory in which the data received from the host is to be stored and the reserved buffer memory to be allocated as the main buffer memory.

3. The storage device of claim 2, wherein the mapping controller includes a mapping table including a mapping relationship of an index corresponding to the main buffer memory and a mapping relationship of an index corresponding to the reserved buffer memory.

4. The storage device of claim 3, wherein, when the data received from the host is stored in the main buffer memory, the mapping controller sets the main buffer memory as a used buffer memory in which another data received from the host is not stored.

5. The storage device of claim 4, wherein the mapping controller:
remaps the index of the main buffer memory in which the data received from the host is stored to the reserved buffer memory; and
establishes the mapping table by allocating the remapped reserved buffer memory as the main buffer memory.

6. The storage device of claim 5, wherein the mapping controller generates remapping information including information on the remapped reserved buffer memory and an index corresponding to the remapped reserved buffer memory.

7. The storage device of claim 6, wherein, when the response controller receives the remapping information from the mapping controller, the response controller outputs the storage completion response.

8. The storage device of claim 6, wherein the buffer memory stores subsequent data received from the host in the main buffer memory, based on the remapping information.

9. The storage device of claim 4, wherein the mapping controller determines whether the data stored in the used buffer memory has been stored in the memory device.

10. The storage device of claim 9, wherein, when the data stored in the used buffer memory is not stored in the memory device, the data stored in the used buffer memory is retained until the data stored in the used buffer memory is stored in the memory device.

11. The storage device of claim 10, wherein, when the data stored in the used buffer memory is transmitted to the memory device, the data stored in the used buffer memory is erased.

12. The storage device of claim 11, wherein, when the data stored in the used buffer memory is erased, an index corresponding to the used buffer memory is remapped to the reserved buffer memory.

13. A method for operating a storage device including a buffer memory for storing data received from a host, a memory device for storing data received from the buffer memory, and a memory controller for controlling the buffer memory and the memory device, the method comprising:
receiving data and a storage request corresponding thereto from the host;
storing the data received from the host in the buffer memory according to mapping information;
performing a remapping operation of changing an area in which the data is stored among usable storage areas of the buffer memory to an unusable area when the data received from the host is stored in the buffer memory;
generating remapping information, based on the remapping operation; and
outputting a storage completion response after an indexing of the remapping operation to a reserved buffer memory corresponding to a remapping request is completed and before transmission of the data from the buffer memory.

14. The method of claim 13,
wherein the buffer memory is divided into a main buffer memory in which the data received from the host is to be stored and the reserved buffer memory to be allocated as the main buffer memory, and
wherein, in the storing of the data received from the host in the buffer memory, the data received from the host is stored in the main buffer memory.

15. The method of claim 14, wherein the performing of the remapping operation includes setting the main buffer memory as a used buffer memory in which another data received from the host is not stored when the data received from the host is stored in the main buffer memory.

16. The method of claim 15, wherein, in the performing of the remapping operation, an index of the main buffer memory in which the data received from the host is stored is remapped to the reserved buffer memory.

17. The method of claim 15, further comprising determining whether the data stored in the used buffer memory has been transmitted to the memory device.

18. The method of claim 17, further comprising:
retaining the data stored in the used buffer memory until the data stored in the used buffer memory is stored in the memory device when it is determined that the data stored in the used buffer memory has not been transmitted to the memory device; and
erasing the data stored in the used buffer memory when it is determined that the data stored in the used buffer memory has been stored in the memory device.

19. The method of claim 18, further comprising, when it is determined that the data stored in the used buffer memory has been stored in the memory device, remapping an index corresponding to the used buffer memory to the reserved buffer memory after the data stored in the used buffer memory is erased.

20. A memory device comprising:
a first memory assigned as a main memory;
a second memory assigned as a reserved memory;
a memory device; and
a control component configured to:
buffer, into the first memory, data provided along with a command from a host;
remap the first memory to the second memory to assign the second memory as the main memory;
output a storage completion response after an indexing of the remap to a reserved buffer memory corresponding to a remapping request is completed and before transmission of the data from the first memory;
control the memory device to store therein the buffered data; and
release the remap to assign the first memory as the reserved memory.

* * * * *